United States Patent
Ciocca et al.

(10) Patent No.: US 6,221,470 B1
(45) Date of Patent: Apr. 24, 2001

(54) MULTILAYER OXYGEN BARRIER PACKAGING FILM

(75) Inventors: Paolo Ciocca, Lumellogno; Roberto Forloni, Milan, both of (IT)

(73) Assignee: Cryovac, Inc., Duncan, SC (US)

(*) Notice: Subject to any disclaimer, the term of this patent is extended or adjusted under 35 U.S.C. 154(b) by 0 days.

(21) Appl. No.: 09/125,486

(22) PCT Filed: Feb. 14, 1997

(86) PCT No.: PCT/EP97/00698

§ 371 Date: Dec. 10, 1998

§ 102(e) Date: Dec. 10, 1998

(87) PCT Pub. No.: WO97/30847

PCT Pub. Date: Aug. 28, 1997

(30) Foreign Application Priority Data

Feb. 23, 1996 (IT) ................................. MI96A0337

(51) Int. Cl.⁷ ........................... B32B 27/08; B32B 27/32
(52) U.S. Cl. ........................... 428/218; 428/220; 428/516
(58) Field of Search ................... 428/218, 220, 428/516

(56) References Cited

U.S. PATENT DOCUMENTS

| | | | |
|---|---|---|---|
| 4,615,926 | 10/1986 | Hsu et al. | 428/35 |
| 4,746,562 | 5/1988 | Fant | 428/516 |
| 4,837,084 | 6/1989 | Warren | 428/349 |
| 5,318,829 * | 6/1994 | Tada et al. | 428/213 |
| 5,629,059 * | 5/1997 | Desai et al. | 428/34.9 |
| 5,914,164 * | 6/1999 | Ciocca et al. | 428/36.7 |

FOREIGN PATENT DOCUMENTS

| | | |
|---|---|---|
| 0 744 285 A1 | 5/1995 | (EP) . |
| WO 93/03093 | 2/1993 | (WO) . |
| WO 95/33621 | 12/1995 | (WO) . |

* cited by examiner

*Primary Examiner*—Blaine Copenheaver
(74) *Attorney, Agent, or Firm*—Mark B. Quatt

(57) ABSTRACT

A thermoplastic multilayer packaging film has a core layer including ethylene/vinyl alcohol copolymer; two outer layers, and two adhesive layers each disposed between the core layer and a respective outer layer, characterized in that at least one of the outer layers includes a blend of A, B, and C, wherein component A is a homogeneous or heterogeneous ethylene/alpha olefin copolymer with density comprised greater than 0.915 g/cm³ and less than 0.925 g/cm³, component B is a homogeneous or heterogeneous ethylene/alpha olefin copolymer with density greater than or equal to 0.925 g/cm³, and component C is a homogeneous or heterogeneous ethylene/alpha olefin copolymer with density less than or equal to 0.915 g/cm³. The use of modified homogeneous ethylene/alpha olefin copolymers with a density of from 0.900 g/cm³ to 0.908 g/cm³ as adhesive layers to improve the interlayer adhesion and the sealability properties of films with a core layer comprising an ethylene/vinyl alcohol copolymer or a polyamide and outer layers comprising an ethylene/alpha olefin copolymer is also described.

22 Claims, 1 Drawing Sheet

MULTILAYER OXYGEN BARRIER PACKAGING FILM

FIELD OF THE INVENTION

The present invention refers to a multilayer film endowed with good optical, mechanical, gas barrier, and heat sealability properties. The film is particularly suitable for packaging food products.

BACKGROUND OF THE INVENTION

Multilayer, thermoplastic films are being used for packaging various food and non food products because they protect the item itself from the environment during storage and distribution. Furthermore, for the end consumer, it is desirable to present the product packaged in a preferably transparent thermoplastic film that allows visible inspection of the package contents to help assure the quality of the product.

Optical characteristics are therefore often important for a thermoplastic film for packaging.

Other properties are also desirable, such as good mechanical properties that keep the package unaltered until it is offered to the customer on consumer.

A shrink feature can also be imparted to a thermoplastic film by orientation or stretching of the film, either monoaxially or biaxially, during film manufacture. This shrink feature allows the film to shrink or, if restrained, create shrink tension within the film upon exposure to heat. In a typical process, the thick structure which is extruded through either a round or a flat extrusion die is quickly quenched, then it is heated to a suitable temperature, called the orientation temperature, which is higher than the glass transition temperature ($T_g$) of the resins used in the film itself but lower than the melting temperature ($T_m$) of at least one of the resins, and stretched in either or both of the machine (longitudinal) and transverse directions.

For food packaging, it is often necessary that the film has oxygen barrier characteristics to delay or avoid product oxidation or degradation during its shelf-life.

Good heat sealability is sometimes required. It is essential, particularly for oxygen barrier films used in applications where the contained product is to be kept either under vacuum or under a modified atmosphere, that the seal(s) that close the package have adequate strength and, as a consequence thereof, that the package remains tight.

Several different materials have been used to decrease the oxygen permeability of thermoplastic films. Among these materials a very good gas barrier material is EVOH (ethylene/vinyl alcohol copolymer). Several "barrier" thermoplastic films comprising an EVOH layer are described in the patent literature.

In prior art films the different materials employed for the skin layers are suitably combined with the aim of improving as much as possible the film characteristics, particularly those characteristics that are needed for the specific intended applications. As an example, the use of a low density ethylene/alpha olefin copolymer provides for fair heat-sealability and remarkable oil resistance properties; the use of EVA (ethylene/vinyl acetate copolymer) improves the shrinkability and the sealability properties; the use of propylene homo- and/or copolymer increases the stiffness of the structure; etc.

It is however known that a resin that improves a specific property typically worsens other properties, and therefore the research efforts in this field tend to reach an optimum balance of these properties.

More particularly the film characteristics that still need to be improved, in a way that however should not negatively affect the other characteristics such as optical, mechanical, barrier and shrinkability properties, are the sealability properties.

It has now been found that it is possible to provide a film with optical and gas barrier properties at least comparable to those of known films containing EVOH, and having remarkably improved mechanical and heat-sealability properties, by using in the film sealing layer a blend of ethylene/alpha olefin copolymers of suitably selected different densities.

SUMMARY OF THE INVENTION

In one aspect, a multilayer thermoplastic film comprises a core layer comprising an ethylene/vinyl alcohol copolymer; two outer layers; and two adhesive layers each disposed between the core layer and a respective outer layer; wherein at least one of the outer layers comprises a blend of a homogeneous or heterogeneous ethylene/alpha olefin copolymer having a density of greater than 0.915 g/cm$^3$ and less than 0.925 g/cm$^3$, a homogeneous or heterogeneous ethylene/alpha olefin copolymer having a density greater than or equal to 0.925 g/cm$^3$, and a homogeneous or heterogeneous ethylene/alpha olefin copolymer having a density less than or equal to 0.915 g/cm$^3$.

Only one of the outer layers (the outer layer that will be used as the sealing layer) needs to comprise a blend as defined above. The other outer layer can have a different composition and comprise a single polymer or a blend of a polymers typically selected from ethylene homo- and co-polymers, e.g. polyethylene, homogeneous or heterogeneous ethylene/alpha olefin copolymers, EVA, etc. In a preferred embodiment, however, both outer layers comprise a blend as defined above.

Films of the invention comprise at least five layers. Films with a higher number of layers, either symmetrical or unsymmetrical, are obtained when one or more additional layers are present between the adhesive layers and one or both of the outer layers, and/or between the core layer and one or both of the adhesive layers.

Preferably, the adhesive layers directly adhere to the core layer.

When, in said preferred embodiment, the surface of each of the adhesive layers that does not adhere to the core layer, directly adheres to the respective outer layer, the film will contain five layers.

Films can also contain a higher number of layers if one or more additional layers are positioned between the adhesive layers and the outer layers. As an example, a six or seven layer film can comprise additional layer(s) between the adhesive layers and the outer layers, the additional layers made with recycle material from the scrap of the same film, optionally blended with a compatibilizer.

In a second aspect, a multilayer thermoplastic film comprises a core layer comprising an ethylene/vinyl alcohol copolymer, the core layer having two major surfaces; two intermediate layers each comprising polyamide, each of which is directly adhered to one of the two major surfaces of the core layer; two outer layers; and two adhesive layers each disposed between a respective intermediate layer and a respective outer layer; wherein at least one of the outer layers comprises a blend of a homogeneous or heterogeneous ethylene/alpha olefin copolymer having a density of greater than 0.915 g/cm$^3$ and less than 0.925 g/cm$^3$, a homogeneous or heterogeneous ethylene/alpha olefin copolymer having a density greater than or equal to 0.925 g/cm³, and a homogeneous or heterogeneous ethylene/alpha olefin copolymer having a density less than or equal to 0.915 g/cm³.

The film of this embodiment is thus a seven layer film, when each of the adhesive layers is directly adhered to a respective intermediate layer as well as to a respective outer layer. It may also comprise more than seven layers when additional layers, such as layers made with recycle material, are present between the adhesive layers and the outer layers.

DEFINITIONS

As used herein, the term:

"film" refers to a flat or tubular flexible structure of thermoplastic material having a thickness up to about 120 μm. Generally, for the purposes of the present invention, said structure will have a thickness of up to about 60 μm and typically up to about 35 μm;

"core layer" or "inner layer" refer to any film layer having its two principal surfaces adhered to other layers of the multilayer film;

"outer layer" or "skin layer" refers to any film layer of a multilayer film having only one of its principal surfaces directly adhered to another layer of the film;

"heat-sealing" or "heat-sealant" layer, as applied to multilayer films, refers to an outer layer which is involved in the sealing of the film to itself, to another film layer of the same or another film, and/or to another article which is not a film;

"adhesive layer" or "tie layer" refer to any inner layer having the primary purpose of adhering two layers to one another;

"directly adhered" as applied to film layers is defined as adhesion of the subject film layer to the object film layer, without a tie layer, an adhesive or other layer in between. In contrast, as used herein, the word "between", as applied to a film layer expressed as being between two other specified layers, includes both direct adherence of the subject layer to the two other layers it is between, as well as a lack of direct adherence to either or both of the two other layers the subject layer is between, i.e. one or more additional layers can be present between the subject layer and one or more of the layers the subject layer is between;

"heat-shrinkable" film refers to a film drawn mono-axially or biaxially that upon heating for 5 seconds at a temperature of 120° C. shows a free shrink of at least 10% in at least one direction;

"homopolymer" refers to a polymer resulting from the polymerization of a single monomer, i.e. a polymer consisting essentially of a single type of repeating unit;

"copolymer" refers to a product of a polymerization reaction involving two or more different comonomers;

"polyolefin" refers to a thermoplastic resin obtained by polymerization of an olefin, or by copolymerization of two or more olefins or of one or more olefins with other comonomers, wherein the olefin units are present in larger amounts than any possibly present comonomer. Suitable examples of "polyolefins" are polyethylene, ethylene/alpha olefin copolymer (either heterogeneous or homogeneous), ethylene/vinyl acetate copolymer, ethylene/acrylic acid or methacrylic acid copolymers, etc.;

"modified polyolefin" refers to a polyolefin characterised by the presence of functional groups such as anhydride or carboxy groups. Examples of said modified polyolefins are graft copolymers of maleic acid or maleic acid anhydride onto ethylene/alpha olefin or ethylene/vinyl acetate copolymer, polymerisation products of these with other polar monomers, blends thereof, etc.;

"EVOH" or the phrase "ethylene/vinyl alcohol copolymer" refer to saponified or hydrolysed products of ethylene/vinyl ester copolymer, generally of ethylene/vinyl acetate copolymer, wherein the ethylene content is typically between 20 and 60 mole %, preferably between 28 and 49 mole %, and the degree of saponification is higher than 90%, preferably higher than 95%;

"polyamide" refers to high molecular weight polymers having amide linkages along the molecular chain. Such term encompasses both polyamides and copolyamides with aliphatic and/or aromatic repeating units, either crystalline, semi-crystalline or amorphous;

"ethylene/alpha olefin copolymer" refers to a copolymerization product of ethylene with one or more alpha olefins, e.g. butene-1, hexene-1, methyl-4-pentene-1, octene-1, as well as blends thereof. Said phrase includes both heterogeneous and homogeneous ethylene/alpha olefin copolymers;

"heterogeneous ethylene/alpha olefin copolymer" refers to those polymerization reaction products characterised by a relatively wide variation in molecular weight and composition distribution. Such heterogeneous polymers typically contain a relatively wide variety of chain lengths and comonomer percentages. The molecular distribution, expressed as $M_w/M_n$ wherein $M_w$ is the weight average molecular weight, and $M_n$ is the number average molecular weight, is higher than 3. These heterogeneous polymers are typically prepared by using the conventional Ziegler-Natta catalysts in heterogeneous phase. Depending on the density these copolymers are generally indicated by the abbreviations LMDPE (linear medium density polyethylene—that conventionally designates heterogeneous ethylene/alpha olefin copolymers having a density greater than or equal to 0.925 g/cm³), LLDPE (linear low density polyethylene—that conventionally designates heterogeneous ethylene/alpha olefin copolymers having a density of from 0.915 g/cm³ to 0.925 g/cm³), and VLDPE (very low density polyethylene—that conventionally designates heterogeneous ethylene/alpha olefin copolymers having a density less than or equal to 0.915 g/cm³);

"homogeneous ethylene/alpha olefin copolymers" refers to polymerization reaction products of relatively narrow molecular weight distribution and relatively narrow composition distribution. Such homogeneous polymers structurally differ from heterogeneous polymers in that they exhibit a relatively even sequencing of comonomers within a chain, the mirroring of sequence distribution in all chains, and the similarity of length of all chains. With a few exceptions (such as the homogeneous linear ethylene/alpha olefin copolymers named TAFMER™ that are manufactured by Mitsui Petrochemical Corporation using homogeneous Ziegler-Natta catalysts), homogeneous polymers are generally prepared using "metallocene", or "single-site", or "constrained-geometry" catalysts. Homogeneous polymers can be identified and classified by molecular weight distribution ($M_w/M_n$), and composition distribution breath index (CDBI). Molecular weight distribution, also known as polydispersity, may be determined by gel permeation chromatography. Homogeneous ethylene/alpha olefin copolymers useful in the present invention have a ($M_w/M_n$) of less than about 3. The CDBI of such homogeneous ethylene/alpha olefin copolymers will be greater than 60%, e.g. greater than 70%. CDBI is defined as the weight percent of the polymer molecules having a comonomer content within 50 percent (i.e. plus or minus 50%) of the median total molar comonomer content. The CDBI of a polyethylene homopolymer, which does not contain a comonomer, is by definition 100%. The CDBI is readily calculated from data obtained from techniques known in the art, such as Temperature Rising Elution Fractionation (TREF) as described for instance by Wild et al. in Journal of Polymer Science, Poly. Phys. Ed., Vol. 20, p.441 (1982). Homogeneous ethylene/alpha olefin copolymers, obtained by using metallocene catalysts, are commercialised by Exxon Chemical Company under the trade name EXACT™, by BASF as LUFLEXEN™, and by Dow as AFFINITY™ or ENGAGE™ resins.

BRIEF DESCRIPTION OF THE DRAWINGS

The invention may be further understood with reference to the drawings wherein.

DETAILED DESCRIPTION OF THE INVENTION

Figure 1:
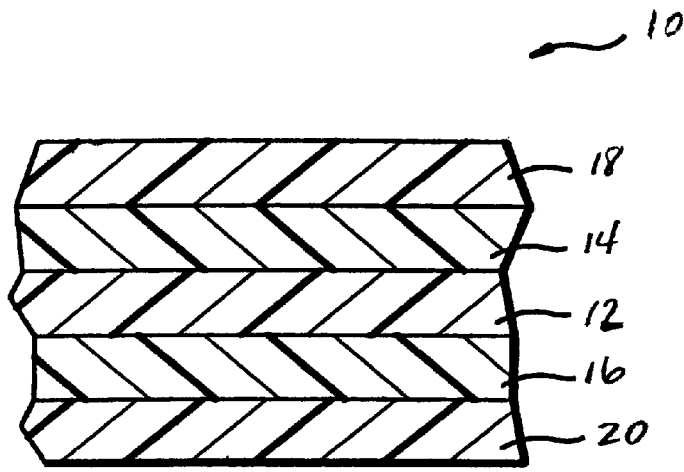
FIGS. 1 and 2 are schematic cross-sections of various embodiments of a film of the present invention.

With reference to FIG. 1, film 10 comprises a core layer 12 comprising an ethylene/vinyl alcohol copolymer, two outer layers 18 and 20, and two adhesive layers 14 and 16 each disposed between the core layer 12 and a respective outer layer, wherein at least one of the outer layers 18 and 20 comprises a blend of a homogeneous or heterogeneous ethylene/alpha olefin copolymer having a density of greater than 0.915 g/cm$^3$ and less than 0.925 g/cm$^3$, a homogeneous or heterogeneous ethylene/alpha olefin copolymer having a density greater than or equal to 0.925 g/cm$^3$, and a homogeneous or heterogeneous ethylene/alpha olefin copolymer having a density less than or equal to 0.915 g/cm$^3$.

Figure 2:
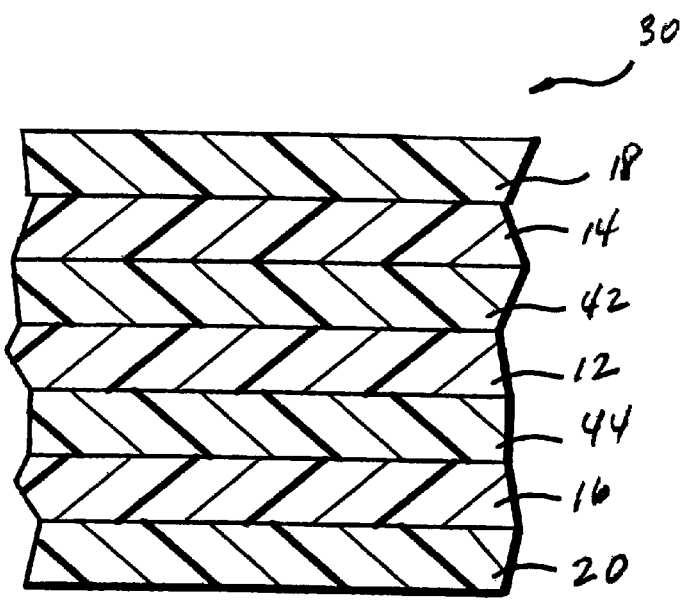

With reference to FIG. 2, film 30 comprises a core layer 12 comprising an ethylene/alpha alcohol copolymer, the core layer having two major surfaces; two intermediate layers 42 and 44 each comprising polyamide, each of which is directly adhered to one of the two major surfaces of the core layer 12; two outer layers 18 and 20, and two adhesive layers 14 and 16 each disposed between a respective intermediate layer and a respective outer layer, wherein at least one of the outer layers 18 and 20 comprises a blend of a homogeneous or heterogeneous ethylene/alpha olefin copolymer having a density of greater than 0.915 g/cm$^3$ and less than 0.925 g/cm$^3$, a homogeneous or heterogeneous ethylene/alpha olefin copolymer having a density greater than or equal to 0.925 g/cm$^3$, and a homogeneous or heterogeneous ethylene/alpha olefin copolymer having a density less than or equal to 0.915 g/cm$^3$.

The thickness of the film can vary depending on the end use thereof. It is preferably between 12 and 80 μm, and more preferably between 14 and 60 μm thick. For use as a packaging film, the film thickness is preferably between 12 and 35 μm, and more preferably between 14 and 26 μm, for use in the manufacture of bags the thickness is preferably between 35 and 65 μm, and more preferably between 40 and 60 μm.

In the outer layers, the homogeneous or heterogeneous ethylene/alpha olefin copolymer having a density of greater than 0.915 g/cm$^3$ and less than 0.925 g/cm$^3$ (component A) is present in the highest percent (by weight) in the blend, and comprises between 35 and 80%, preferably between 40 and 70%, more preferably between 45 and 65% by weight of the outer layers. The homogeneous or heterogeneous ethylene/alpha olefin copolymer having a density greater than or equal to 0.925 g/cm$^3$ (component B), and the homogeneous or heterogeneous ethylene/alpha olefin copolymer having a density less than or equal to 0.915 g/cm$^3$ (component C), each comprise between 10 and 35%, preferably between 15 and 30%, and more preferably between 20 and 25% by weight of the outer layers.

When amounts lower than 10% are employed for component B, the film that is thus obtained has less desirable mechanical properties. It was found that the modulus of films wherein component B is absent in the outer layers is significantly lower than that of the same films containing at least 10% of said component in the outer layers.

The use of component C in amounts lower than 10% significantly decreases the shrink and heat sealability properties of the film.

Optimal ratios between the various components in the blend are 50:25:25, 40:30:30, 60:20:20, 60:25:15, and 50:30:20 (component A: component B: component C).

The thickness of the outer layers is not critical and depends in part on the overall film thickness and on the number of different layers therein. When used as a film for packaging, a suitable thickness for each outer layer is between 3 and 12 μm, while when used for the manufacture of bags for packaging, a suitable thickness is between 8 and 20 μm.

At least one of the outer layers preferably contains additives, such as those conventional additives that are used in small amounts to improve resin processability or the properties of the end film. Examples of said additives are antioxidant agents, slip and anti-block agents, UV absorbers, antimicrobial agents, pigments, anti-fog agents or compositions, cross-linking agents or cross-link inhibitors, oxygen scavenging agents or compositions, etc.

The density of component A is preferably between 0.918 g/cm$^3$ and 0.922 g/cm$^3$. The density of component B is preferably equal to or higher than 0.928 g/cm$^3$, and preferably between 0.928 and 0.938 g/cm$^3$. The density of component C is preferably equal to or lower than 0.912 g/cm$^3$ and even more preferably lower than 0.905 g/cm$^3$. Preferably, component C has a density between 0.895 g/cm$^3$ and 0.912 g/cm$^3$, and preferably between 0.898 g/cm$^3$ and 0.905 g/cm$^3$.

The melt flow index (MFI) of the copolymers of components A, B, and C is preferably between 0.2 g/10 minutes and 10 g/10 minutes, more preferably between 0.5 g/10 minutes and 5.0 g/10 minutes, and most preferably between 0.8 g/10 minutes and 3.0 g/10 minutes. The use of copolymers with low MFI increases the mechanical resistance of the film, but negatively affects resin processability.

Components A and B are preferably a heterogeneous ethylene/alpha olefin copolymer Component C is preferably a homogeneous ethylene/alpha olefin copolymer. Use of either a homogeneous or a heterogeneous copolymer brings about a widening of the sealability window; however, the width of the sealability window is higher for a homogeneous copolymer.

The sealability window represents in practice the temperature range within which it is possible to seal the film obtaining a substantially constant seal strength above a fixed acceptable lower limit. Since it is often difficult and sometimes impossible to maintain the sealing bars at the same temperature, it is in practice necessary to have a sealing window as wide as possible to guarantee that almost all the obtained seals, in spite of the possible and frequent temperature fluctuations of the sealing bars, have an acceptable seal strength.

Furthermore, frequently the thermoplastic film plies to be sealed together do not lie absolutely flat on one another but some wrinkling occurs in one or both of the film plies. To guarantee a seal of a suitable strength in all packages it is therefore necessary to increase the temperature of the sealing bars and/or increase the sealing time with respect to the theoretical value. A narrow sealing window will therefore create problems because the temperature reached by the film in those areas where there are not wrinkles can cause the thermoplastic material to melt, the film to be cut by the pressure of the sealing bars, and the material to be deteriorated with a consequent significant loss in productivity.

It has now been found that by replacing in a prior art film, such as that described in EP-B-217,596, the ethylene/vinyl acetate copolymer in the ternary blend of the outer layers with component C, it is possible to enlarge the sealing window by at least 10° C. By using as component C a homogeneous ethylene/alpha olefin copolymer, said enlargement of the sealing window reaches 20° C.

In a preferred embodiment of the present invention, the film is an oriented and heat shrinkable film.

Heat shrinkable embodiments of the film have a free shrink, measured at 120° C., of at least 20%, preferably at least 30%, and more preferably at least 40% in at least one direction. Most preferably, heat shrinkable embodiments of the film have a free shrink, measured at 120° C., of at least 20%, preferably at least 30%, and more preferably at least 40% in both directions.

The core layer comprises EVOH. Commercial examples are EVAL™ EC F151A or EVAL™ EC F101A, marked by Marubeni.

A single EVOH or a blend of two or more EVOH resins can be employed. Also a blend of one or more EVOH resins with one or more polyamides can be employed. In this case, suitable polyamides are those commonly indicated as nylon 6, nylon 66, nylon 6/66, nylon 12, nylon 6,12, and the like. A preferred polyamide is nylon 6/12, a copolymer of caprolactam with laurolactam, such as GRILON™ CF 6S or GRILON™ W8361 manufactured and marked by EMS.

In order to improve processability, particularly when a heat-shrinkable film is desired, a blend of EVOH with a varying amount of one or more polyamides is preferably employed. Generally, if a high oxygen barrier is needed, the amount of polyamide blended with EVOH will not be higher than 30% by weight of the blend. It is however possible to increase this amount when a limited oxygen barrier is desired. As an example for the packaging of respiring foods, such as vegetables and cheese, where in general a fair permeability to $CO_2$ is desired and it is not necessary to have a high oxygen barrier, it is possible to use blends of EVOH with polyamides wherein the polyamide(s) are employed in an amount of up to 85% by weight on the overall weight of the core layer blend.

The thickness of the barrier layer can vary, depending in part on the overall thickness of the film and on its use, between 2 and 10 $\mu$m. A preferred thickness is between 2.5 and 5 $\mu$m.

The adhesive layers comprise a modified polyolefin as indicated above. Examples of said conventional modified polyolefins are BYNEL™ CXA 4104 or BYNEL™ CXA 4105 marked by DuPont, PLEXAR™ 169 marked by Quantum, or some ADMER™ resins by Mitsui.

It is however been found that when modified polyolefins based on homogeneous ethylene/alpha olefin copolymers with a density of between 0.880 g/cm³ and 0.908 g/cm³ are employed in the adhesive layers, the bond between the layers is remarkably high and there are minimal or no delamination problems.

Furthermore it was found unexpectedly that by using said materials, and preferably by using modified polyolefins based on homogeneous ethylene/alpha olefin copolymers with a density of between 0.900 g/cm³ and 0.908 g/cm³, in at least one of the adhesive layers, a remarkable increase of the seal strength is obtained and as a consequence thereof an increase of the hot and cold seal resistance.

Examples of said adhesives are ADMER™ AT 1093E (density=0.903 g/cm³ and MFI=1.3 g/10 minutes) and ADMER™ AT 1094E (density=0.906 g/cm³ and MFI=1.5 g/10 minutes) manufactured by Mitsui.

Also the thickness of the adhesive layers may vary depending on the overall film thickness and on the type of resin employed. In general, adhesive layers having a thickness of between 2 and 8 $\mu$m, and preferably between 2.5 and 6 $\mu$m, are employed.

It was found that the unexpected improvements in the seal strength are obtained in all films comprising an ethylene/alpha olefin copolymer in the sealing layer.

In a preferred aspect both adhesive layers comprise a modified homogeneous ethylene/alpha olefin copolymer with a density of between 0.900 g/cm³ and 0.908 g/cm³.

The films according to the present invention are typically obtained by coextrusion of the resins and/or blends of resins of the various layers through a round or flat extrusion die, quickly followed by quenching at room temperature. Alternatively, the film according to the present invention may be prepared by extrusion coating, wherein one or more layers are coated, still by extrusion, on top of a first extruded or co-extruded tube or sheet.

If a heat-shrinkable film is desired, the thus obtained thick tube or sheet is heated to the orientation temperature, generally comprised between about 110° C. and about 125° C., by passing it through a hot air tunnel or an IR oven and stretched mono- or bi-axially. When a round extrusion die is employed, stretching is generally carried out by the trapped bubble technique. In this technique the inner pressure of a gas such as air is used to expand the diameter of the thick tubing obtained from the extrusion to give a larger bubble transversely stretched, and the differential speed of the nip rolls that hold the bubble is used to get the longitudinal stretching. Generally stretching is in a ratio of at least 3 in each direction. Alternatively, when a flat die is used in the extrusion, if a heat-shrinkable film is desired, orientation is carried out by means of a tenter frame. Longitudinal stretching is generally obtained by passing the film on at least two couples of conveying rolls wherein the second set rotates at a speed higher than that of the first set. The transverse orientation is on the other hand obtained by blocking the film side edges by means of a series of clips that travel onto two continuous chains that gradually diverge with the advancing of the film. Alternatively to said sequential stretching, either longitudinal first and then transversal or transversal first and then longitudinal, stretching may also be simultaneous in both directions. In case of stretching by tenter-frame the stretching ratios are generally higher than with the trapped bubble method.

Film of the present invention is preferably cross-linked. Cross-linking may be achieved either by irradiation or chemically. Radiation involves submitting the film to a suitable radiation dosage of high energy electrons, preferably between 10 and 120 kGrays, and preferably from 20 and 90 kGrays.

If a heat-shrinkable film is desired, irradiation is preferably but not necessarily performed before orientation. If only some of the layers of the films need to be irradiated, the extrusion coating technique can be used and the irradiation step carried out on the primary tube or sheet, or the broad beam irradiation system can be used.

When the whole film is cross-linked by electron-beam irradiation, it may be advantageous to make use of cross-linking controlling agents which can be added to the different layers in different amounts to control the degree of cross-linking in each layer. Suitable cross-linking controlling agents are for instance those described in EP-A-333,294.

Alternatively, chemical cross-linking of the resins can be achieved by the addition of suitable cross-linking agents, e.g. peroxides, to the resins to be cross-linked. It is also possible to combine chemical cross-linking and irradiation, as an example when the cross-linking agents added to the resins need some irradiation to trigger the cross-linking reaction.

The films according to the present invention may optionally be subjected to other types of energetic radiation treatments which may have different aims. As an example the film may be subjected to a corona discharge treatment to improve the print receptivity characteristics of the film surface.

In case of oriented heat-shrinkable films, it may sometimes be desirable to selectively reduce the shrink force of the thus obtained film, at least in the transverse direction, without appreciably reducing the % free shrink. This can be useful for instance when the film is used as a tray wrapping or a tray lidding. It has in fact been found that with most of the commercial trays it is advisable to use films having a shrink force in the transverse direction lower than 0.5 N/cm (0.05 kg/cm) to avoid tray distortion. In such a case the desired reduction in shrink force may be achieved by subjecting the film obtained by the above general method to a heat treatment under strictly controlled conditions. In particular such a heat treatment involves heating the film to a temperature of from 65 to 95° C. for a time of from 0 to 7.5 seconds and then cooling it down to a temperature below room temperature, preferably below 20° C., in less than 5 seconds. When a cross-linked film is desired, such a heat-treatment may be carried out, after orientation, either before or after cross-linking.

The Examples that follow are aimed at better illustrating some representative embodiments of the present invention.

Density is measured by ASTM D 792.

The indicated melting points, if not other wise indicated, are determined by DSC analysis following ASTM D 3418 ($2^{nd}$ heating—10° C./min).

Melt Flow Index is measured according to ASTM D-1238, Condition E, at 190° C. and is reported as grams per 10 minutes.

In order to evaluate the films according to the present invention the following tests have been used:

% unrestrained free shrink: the % free shrink, i.e., the irreversible and rapid reduction, as a percent, of the original dimensions of a sample subjected to a given temperature under conditions where nil restraint to inhibit shrinkage is present, was measured according to ASTM method D 2732, by immersing for 5 seconds specimens of the films (100-mm by 100-mm) into a bath of hot oil at 120° C. The % free shrink was measured in both the longitudinal (machine) and transverse directions. The percent free shrink is defined, for each direction, as Unrestrained linear shrinkage, $\% = [(L_o - L_f)/L_o] \times 100$
wherein $L_o$ is the initial length of side and $L_f$ is the length of side after shrinking.

Shrink tension: the shrink force, which is the force released by the materials during the heating/shrinking process, when referred to the film thickness unit is indicated as shrink tension. There is no standard method to evaluate it. It has therefore been measured by the following internal method: specimens of the films (2.54 cm×14.0 cm) are cut in the longitudinal and transverse direction and clamped between two jaws, one of which is connected to a load cell. The two jaws keep the specimen in the centre of a channel into which an impeller blows heated air and three thermocouples measure the temperature. The signal supplied by the thermocouples is amplified and sent to an output connected to the "X" axis of a X/Y recorder. The signal supplied by the load cell is amplified and sent to an output connected to the "Y" axis of the X/Y recorder. The impeller starts blowing hot air and the force released by the sample is recorded in grams. The temperature is increased at a rate of 2° C./second. As the temperature increases the pen draws on the X/Y recorder the measured profile of the shrink force versus the temperature thus producing a curve of the shrink force (expressed in N) versus temperature (° C.). By dividing the values thus recorded by the specimen width (expressed in cm), the shrink force (in N/cm) is obtained. By further diving it by the thickness (in cm) of the sample, it is obtained the shrink tension, in $N/cm^2$, at the temperature considered.

Haze: haze is defined as the percentage of transmitted light which is scattered forward while passing through the sample and is measured by ASTM D 1003 (Method A).

Gloss: the film gloss, i.e. the surface reflectance of a specimen is measured according to ASTM D 2457–90 at a 60° angle.

Tensile strength: a measure of the force required, under constant elongation, to bread a specimen of the film, was evaluated by ASTM D 882.

Elongation: a measure of the percent extension required to break a specimen of the film, was evaluated by ASTM D 882.

Tensile Modulus: it has also been evaluated by ASTM D 882—Method A (these last three tests relate to the mechanical properties of the film)

Bond: the load necessary to separate two layers of a structure in a partially delaminated sample, 25 mm wide and 100 mm long, is measured and given as an indication of the interlayer adhesion. In the specific case the bond between the core layer and the tie layer was measured.

Broadening of the sealing window: the broadening of the sealing window was evaluated using a Omori S5150J Horizontal Form-Fill-Seal machine equipped with a heat sealing bar. The temperature of the sealing bar was varied, starting from an average value of 140° C., by decreasing it stepwise by 10° C. at the time. The strength of the seal was evaluated on batches of 50 packages per each sealing temperature and it has thus been determined the lowest sealing temperature that still provides for an effective seal. Then the temperature of the sealing bar was increased stepwise by 10° C. at the time starting from the average value of 140° C., and the highest sealing temperature, i.e. the highest temperature at which the seal does not cut the film, was determined on batches of 50 packages per each sealing temperature.

Leaker rate: the improved heat-sealing performance of the films according to the present invention was evaluated by means of a simple technique of leak detection (Dopack system test) based on ASTM D 3078–84. In particular this test method evaluates the incidence of "leakers", i.e. seal defects such as pin-holes which develop at or near the seal through which gases escape from or enter into the package. For each film, one hundred samples are randomly taken from a production of 600 packs obtained on the same packaging machine under the same packaging conditions. Groups of four packs are then tested by immersing them in a plastic cylinder filled with water, closing the container, drawing the vacuum and creating a difference in pressure of $3 \times 10^4$ Pa (0.3 bar). In the presence of pinholes, air which was trapped within the package will escape giving raise to small bubbles that can be easily detected and localised. The number of pinholes or "leakers" that is then determined is called "leaker rate". These characeristics have been evaluated on a Ilapak Delta 2000SB HFFS machine with impulse sealing using Teflon™ coated sealing wires, a sealing temperature of 170° C., a line speed of 55 packages per minute (corresponding to 18 m/min) and sealing pressure of $2.6 \times 10^5$ Pa (2.6 bar—Condition A) or $3.0 \times 10^5$ Pa (3.0 bar—Condition B). These sealing conditions are more drastic than the standard sealing conditions and allow to better discriminate the sealing behaviour of the tested structures.

Hot Tack: the hot seal strength was evaluated by a laboratory method that simulates what happens on a packaging plant. It is measured by means of a dynamometer equipped with hot bars (Hot Tack Tester by Top Wave) set as on an industrial packaging machine (in the present case: $2.6 \times 10^5$ Pa (2.6 bar ) sealing pressure, 100 ms impulse time, and 250 ms cooling time) wherein the sealing temperature is varied. Then the strength of the seal, in $N/mm^2$, is evaluated on 25 mm wide samples and the sealing temperature range within which the seal strength is above a given threshold is determined.

EXAMPLE 1

(i) A symmetrical five layer structure was extruded, irradiated at about 70 kGrays and biaxially oriented out of hot air at about 116° C.

The resultant 25 μm thick film had a layer ratio of about 3/1/1/1/3 and the following general structure:

A1+B1+C1/D/E/D/A1+B1+C1 wherein

A1 is a heterogeneous ethylene/alpha olefin copolymer with d=0.920 g/cm$^3$ and MFI=1.0 g/10 minutes (Dowlex™ 2045E by Dow)

B1 is a heterogeneous ethylene/alpha olefin copolymer with d=0.935 g/cm$^3$ and MFI=2.6 g/10 minutes (Dowlex™ SC2102 by Dow)

C1 is a heterogeneous ethylene/alpha olefin copolymer with d=0.902 g/cm$^3$ and MFI=3.0 g/10 minutes (Teamex™ 1000F by DSM)

The A1+B1+C1 blend has 46.6% of A1, 25% of B1, 25% of C1, 3% of an anti-fog composition, and about 0.4% of silica;

D is a homogeneous ethylene/alpha olefin copolymer (Tafmer™ like) with d=0.906 g/cm$^3$ and MFI=1.5 g/10 minutes, modified with maleic anhydride (m.p. 120° C.) (ADMER™ AT1094E by Mitsui), and E is a blend of 90% of an ethylene-vinyl alcohol copolymer (EVAL™ EC F151A from Marubeni) and 10% of a nylon 6,12 (GRILON™ CF 6S from EMS).

(ii) The obtained film was subjected to a heat treatment that was carried out on a processing unit consisting of the sequence of 6 stainless steel Gross Equatherm heated rollers and two cooled rollers, 16-cm in diameter and 203-cm in length, disposed in such a way that the contact time of the film web with each roller was 0.26 seconds and the total heating time 1.56 seconds.

The temperature (° C.) in the three heating zones, each comprising two rollers, was 68.5–68.5–65.3° C. respectively while that in the cooling zone was 20° C. This heat treatment modified the shrink properties of the film and in particular it substantially reduced the maximum shrink force in the transverse direction of the film leaving almost unaltered the % free shrink. This treatment did not modify the film sealing properties.

EXAMPLE 2

(i) A symmetrical five layer structure was extruded, irradiated at about 80 kGrays and biaxially oriented out of hot air at about 116° C.

The resultant 25 μm thick film had a layer ratio of about 3/1/1/1/3 and the following general structure:

A1+B1+C2/D/E/E/A1+B1+C2 wherein

A1 and B1 were as defined in Example 1 and C2 is a homogeneous ethylene/alpha olefin copolymer with d=0.902 g/cm$^3$ and MFI=1.0 g/10 minutes (m.p. 100° C.) (AFFINITY™ PL1880 by Dow).

The A1+B1+C2 blend contained 46.6% of A1, 25% of B1, 25% of C2, 3% of anti-fog composition, and about 0.4% of silica;

D and E were as in Example 1.

(ii) The obtained film was subjected to a heat treatment as in part (ii) of Example 1.

EXAMPLE 3

(i) A symmetrical five layer structure was extruded, irradiated at about 60 kGrays and biaxially oriented out of hot air at about 116° C.

The resultant 25 μm thick film had a layer ratio of about 3/1/1/1/3 and the following general structure:

A1+B1+F1/D/E/D/A1+B1+F1 wherein

A1 and B1 were as defined in Examples 1 and 2, and F1 is an ethylene-vinyl acetate copolymer (about 4% VA).

The A1+B1+F1 blend contained 46.6% of A1, 25% of B1, 25% of F1, 3% of an anti-fog composition, and about 0.4% of silica;

D and E were as in Examples 1 and 2.

(ii) The obtained film was subjected to a heat treatment as described in part (ii) of Example 1 wherein however the temperature of the heating zones was 80–80–75° C. respectively.

Table I below reports the characteristics of the films of Examples 1, 2, and 3.

While it can be noted that the mechanical, optical, and shrink characteristics of the films of Examples 1 and 2 were comparable to those of the film of Example 3 that differs therefrom in the composition of the skin layers containing an ethylene/vinyl acetate copolymer instead of component C, the sealability characteristics of the films of Examples 1 and 2 were remarkably better than those of the film of Example 3, both in terms of width of the sealing window and in terms of leakers rate.

TABLE I

| Film of Ex. no. | 1 | 2 | 3 |
|---|---|---|---|
| Modulus (L-T[1]) | 539–441 MPa (5500–4500 kg/cm²) | 539–441 MPa (5500–4500 kg/cm²) | 520–431 MPa (5300–4400 kg/cm²) |
| Tensile strength (L-T) | 78–64 MPa (800–650 kg/cm²) | 78–64 MPa (800–650 kg/cm²) | 78–64 MPa (800–650 kg/cm²) |
| Elongation (L-T) (%) | 110–140 | 110–150 | 110–150 |
| Free shrink (L-T) (%) | 65–56 | 64–56 | 60–56 |
| Shrink force (L-T) | 0.59–0.34N/cm (0.06–0.035) (kg/cm) | 0.59–0.34N/cm (0.06–0.035) (kg/cm) | 0.59–0.39N/cm (0.06–0.04) (kg/cm) |
| Haze | 5 | 5.1 | 5.5 |
| Gloss (%) | 120 | 121 | 122 |
| Bond | 1.86N (190) (g/25 mm) | 1.86N (190) (g/25 mm) | 1.86N (190) (g/25 mm) |
| Leakers rate (%) | | | |
| Condition A | 7 | 9 | 13 |
| Condition B | 0 | 0 | 10 |
| Sealing window (° C.) | 120–160 | 120–170 | 130–160 |
| Hot tack (° C.) | 15 | 15 | 10 |

[1]L = longitudinal, T = transversal

EXAMPLE 4

The film of Example 4 was obtained by following the procedure described in Example 1 but using for the outer layers a blend of two components: A1 and C1 containing 71.6% of A1 and 25% of C1, 3% of an antifog composition and about 0.4% of silica.

Table II that follows reports the mechanical characteristics of the films of Examples 1, 2, and 4.

The worsening of the mechanical properties and particularly of modulus and elongation of the film of Example 4 with respect to the films of Examples 1 and 2, that differ therefrom only for the presence of component B1 in the outer layers, is apparent.

TABLE II

| Film of Ex. no. | 1 | 2 | 4 |
|---|---|---|---|
| Modulus (L-T) | 539–441 MPa (5500–4500 kg/cm²) | 539–441 MPa (5500–4500 kg/cm²) | 441–382 MPa (4500–3900 kg/cm²) |
| Tensile strength (L-T) | 78–64 MPa (800–650 kg/cm²) | 78–64 MPa (800–650 kg/cm²) | 78–64 MPa (800–650 kg/cm²) |
| Elongation (L-T) (%) | 110–140 | 110–150 | 120–180 |

EXAMPLE 5

The film of Example 5 was obtained by following substantially the same procedure described in Example 1 i) but replacing C1 with C3, a homogeneous ethylene/alpha olefin copolymer with d=0.915 g/cm³ and MFI=1.0 g/10 minutes (m.p. 108° C.) (AFFINITY™ FM1570 by Dow).

EXAMPLE 6

The film of Example 6 was obtained by following substantially the same procedure described in Example 1 i) but replacing C1 with C4, a homogeneous ethylene/alpha olefin terpolymer with d=0.900 g/cm³ and MFI=1.2 g/10 minutes (m.p. 94° C.) (EXACT™ 3033 by Exxon).

EXAMPLE 7

The film of Example 7 was obtained by following substantially the same procedure described in Example 1 i) but replacing C1 with C5, a homogeneous ethylene/alpha olefin terpolymer with d=0.902 g/cm³ and MFI=2.0 g/10 minutes (m.p. 96° C.) (EXACT™ 9042 by Exxon).

EXAMPLE 8

The film of Example 8 was obtained by following substantially the same procedure described in Example 1 i) but replacing C1 with C6, a heterogeneous ethylene/alpha olefin copolymer with d=0.912 g/cm³ and MFI=3.2 g/10 minutes (ATTANE™ 4202 by Dow).

Table III below compares the sealability properties, in terms of leaker rate (Condition A), of the films of Examples 5, 6, and 7.

TABLE III

| Film of Example no. | 5 | 6 | 7 |
|---|---|---|---|
| Leakers rate (%) | 2 | 8 | 1 |

EXAMPLES 9–12

In the following Examples the influence of the resins used in the tie layers of a film otherwise identical was evaluated. By following the procedure of Example 1 i) and replacing resin D with the materials indicated in following Table IV as D1 to D4, the films of Examples 9 to 12 were obtained. For each of these films in the same Table, the bond between the core layer and the tie layer is reported. By using modified polyolefins based on homogeneous ethylene/alpha olefin copolymers with density <0.910 g/cm³ in the tie layers a significant increase in bond is obtained.

TABLE IV

| Film of Example no. | Resin employed in the tie layer | Bond N/25 mm g/25 mm |
|---|---|---|
| 9 | D1 = maleic anhydride modified homogeneous ethylene/alpha olefin copolymer (d = 0.903 g/cm³ - MFI = 1.3 g/10 minutes - ADMER ™ AT1093E by MITSUI) | 1.4 (140) |
| 10 | D2 = maleic anhydride modified homogeneous ethylene/alpha olefin copolymer (d = 0.905 g/cm³ - MFI = 1.5 g/10 minutes - ADMER ™ AT1072E by MITSUI) | 11 (110) |
| 11 | D3 = maleic anhydride modified ethylene/alpha olefin copolymer (d = 0.910 g/cm³ MFI = 2.7 g/10 minutes -ADMER ™ NF520E by MITSUI) | 0.8 (80) |
| 12 | D4 = maleic anhydride modified ethylene/alpha olefin copolymer (d = 0.911 g/cm³ MFI = 1.3 g / 10 minutes -ADMER ™ AT1073 by MITSUI) | 0.9 (90) |

COMPARATIVE EXAMPLE 13

The film of the Comparative Example was obtained by following substantially the same procedure as in Example 3 with the only difference that D was replaced with D5, a maleic anhydride modified heterogeneous ethylene/alpha olefin copolymer with d=0.920 g/cm³ (BYNEL™ CXA4104 by DuPont).

Following Table V reports both the bond between the core layer and the adhesive layer and the leaker rates of the film of Comparative Example 13 as well as of that of Example 3. It can thus be noticed that in the film of Example 3 there is an increase in the adhesion between the layers and also, unexpectedly, a remarkable improvement of the sealability, in terms of leaker rates.

TABLE V

| Film of | Example 3 | Comparative Example 13 |
|---|---|---|
| Bond | 1.9N/25 mm (190 g/25 mm) | 0.8N/25 mm (85 g/25 mm) |
| Leaker rate (%) | | |
| Condition A | 13 | 60 |
| Condition B | 10 | 20 |

The above comparison shows that using a modified polyolefin based on a homogeneous ethylene/alpha olefin copolymer with a density of from 0.900 g/cm³ to 0.908 g/cm³, particular advantages in terms of sealability are obtained not only when the outer layers comprise a ternary blend as in the preferred films of the present invention but also when the outer layers in general contain an ethylene/alpha olefin copolymer.

EXAMPLE 14

The film of Example 14 was obtained by following substantially the same procedure as in Example 1 i) but increasing the % of A1 from 46.5 to 56.5 and decreasing the % of B1 and C1 from 25 to 20%.

EXAMPLE 15

The film of Example 15 was obtained by following substantially the same procedure of Example 5 but changing the amount of A1, B1, and C5 in the outer layer as follows: A1 46.5%, B1 35%, and C5 15%.

EXAMPLE 16

The film of Example 16 was obtained by following substantially the procedure of the foregoing Example but replacing D with D1 as defined in Example 9.

It is to be understood that variations of the present invention as disclosed can be made without departing from the scope of the invention, which is not limited to the specific embodiments and examples disclosed herein, but extends to the claims presented below.

What is claimed is:

1. A thermoplastic multilayer packaging film comprising
   a) an oxygen barrier core layer comprising ethylene-vinyl alcohol copolymer;
   b) a first and second outer layer,
   c) a first adhesive layer disposed between the core layer and the first outer layer, and
   d) a second adhesive layer disposed between the core layer and the second outer layer,
   wherein the first outer layer comprises a blend of three components A, B, and C, wherein
      i) component A is a homogeneous or heterogeneous ethylene/alpha olefin copolymer with a density greater than 0.915 g/cm³ and less than 0.925 g/cm³,
      ii) component B is a homogeneous or heterogeneous ethylene/alpha olefin copolymer with density greater than or equal to 0.925 g/cm³, and
      iii) component C is a homogeneous or heterogeneous ethylene/alpha olefin copolymer with density less than or equal to 0.915 g/cm³,
   and wherein component A is different from component B and component C.

2. The film of claim 1 wherein each of the first and second adhesive layers directly adheres to the core layer.

3. The film of claim 2 wherein the film comprises five layers wherein the surface of each of the first and second adhesive layers that does not directly adhere to the core layer, directly adheres to the first and second outer layers respectively.

4. The film of claim 2 wherein the film comprises one or more additional layers disposed between the first and second adhesive layers and the respective first and second outer layers.

5. The film of claim 4 wherein said additional layers comprise recycle material from the same film.

6. The film of claim 1 wherein polyamide comprising layers directly adhere to the core layer.

7. The film of claim 6 wherein each of the first and second adhesive layers directly adheres to the surface of a respective polyamide comprising layer that does not directly adhere to the core layer.

8. The film of claim 1 wherein both the first and second outer layers comprise a blend of three components A, B, and C.

9. The film of claim 1 wherein component A is present in the highest weight percent in the blend of the first outer layer.

10. The film of claim 9 wherein component A is present in the first outer layer in an amount of between 35 and 80% by weight of the blend.

11. The film of claim 9 wherein component B and component C are each present in the first outer layer in an amount of between 10 and 35% by weight of the blend.

12. The film of claim 1 wherein component A has a density of between 0.918 g/cm³ and 0.922 g/cm³.

13. The film of claim 1 wherein component B has a density of between 0.928 g/cm³ and 0.938 g/cm³.

14. The film of claim 1 wherein component C has a density of between 0.895 g/cm³ and 0.912 g/cm³.

15. The film of claim 1 wherein component A is a heterogeneous ethylene/alpha olefin copolymer.

16. The film of claim 1 wherein component B is a heterogeneous ethylene/alpha olefin copolymer.

17. The film of claim 1 wherein component C is a homogeneous ethylene/alpha olefin copolymer.

18. The film of claim 1 wherein the film is heat shrinkable.

19. The film of claim 18 wherein the film has a percent free shrink, at 120° C., of at least 20% in at least one direction.

20. The film of claim 1 wherein the first and second adhesive layers comprise modified homogeneous ethylene/alpha olefin copolymers with a density of between 0.880 g/cm³ and 0.908 g/cm³.

21. The film of claim 1 wherein the film is cross-linked.

22. The film of claim 21 wherein the film is irradiatively cross-linked.

* * * * *